July 2, 1946.  T. B. GILLIAM  2,403,275
REFRIGERATING APPARATUS
Filed Dec. 21, 1943  3 Sheets-Sheet 3

Inventor
Thomas B. Gilliam,
By Barry & Cyr
Attorneys

Patented July 2, 1946

2,403,275

UNITED STATES PATENT OFFICE 2,403,275

REFRIGERATING APPARATUS

Thomas B. Gilliam, Washington, D. C.

Application December 21, 1943, Serial No. 515,129

13 Claims. (Cl. 62—2)

1

This invention relates to improvements in refrigerating apparatus and more particularly to improvements in the apparatus disclosed in my Patent 2,117,658, May 17, 1938.

In the patented apparatus, a drum or carrier rotates or moves in a certain relation to a tank containing liquid to be frozen in molds carried by the drum or carrier. While each mold is submerged in the liquid, a refrigerant, such as cold brine, or the like, is circulated through a compartment in the mold in order to cause freezing of the liquid in cell or cells of the mold, and after the mold has been moved above the surface of the liquid in the tank, the ice is thawed sufficiently to permit it to drop out of the mold, by means of electrically created heat or the like.

In the patented apparatus, the refrigerant circulates through the compartment of the mold containing the electrical resistance for heating purposes, and in accordance with the present invention, such resistance is eliminated, and cooling and heating fluids are circulated through a closed compartment of each mold.

Furthermore, in my patented machine the molds were hingedly connected to the carrier or drum which meant relatively movable parts. In the present invention the molds are rigidly connected to the drum or carrier.

The primary purpose of the present invention is to provide a refrigerating machine of the general type disclosed in my prior patent, but containing many improvements which I have devised after witnessing the working of the original machine.

With the foregoing object outlined and with other objects in view which will appear as the description proceeds, the invention consists in the novel features hereinafter described in detail, illustrated in the accompanying drawings, and more particularly pointed out in the appended claims.

In the drawings:

Figs. 6 and 7 are sectional views of valves forming parts of apparatus.

Figure 1:
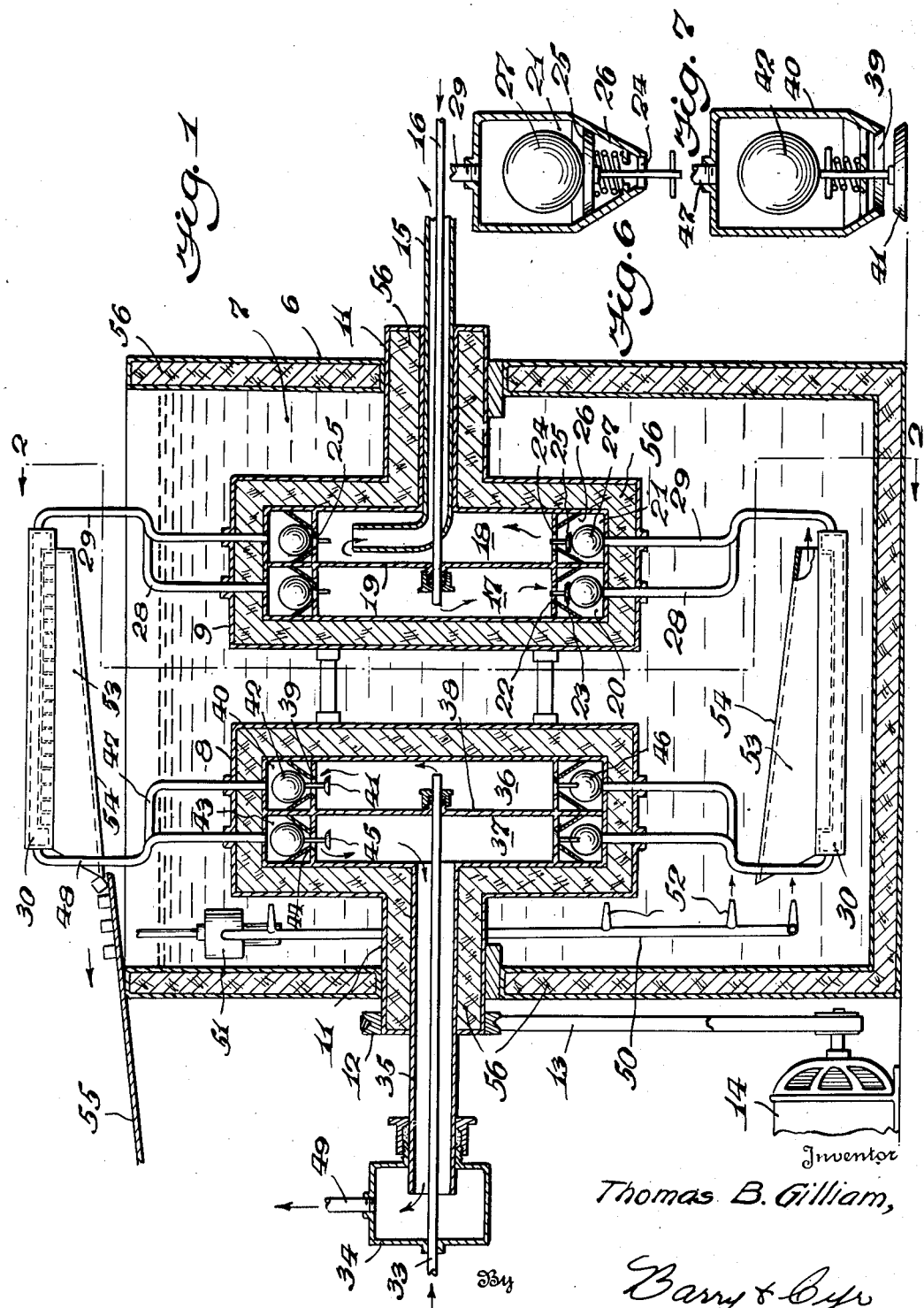
Fig. 1 is a vertical, longitudinal, sectional view of my improved apparatus.
Figure 2:
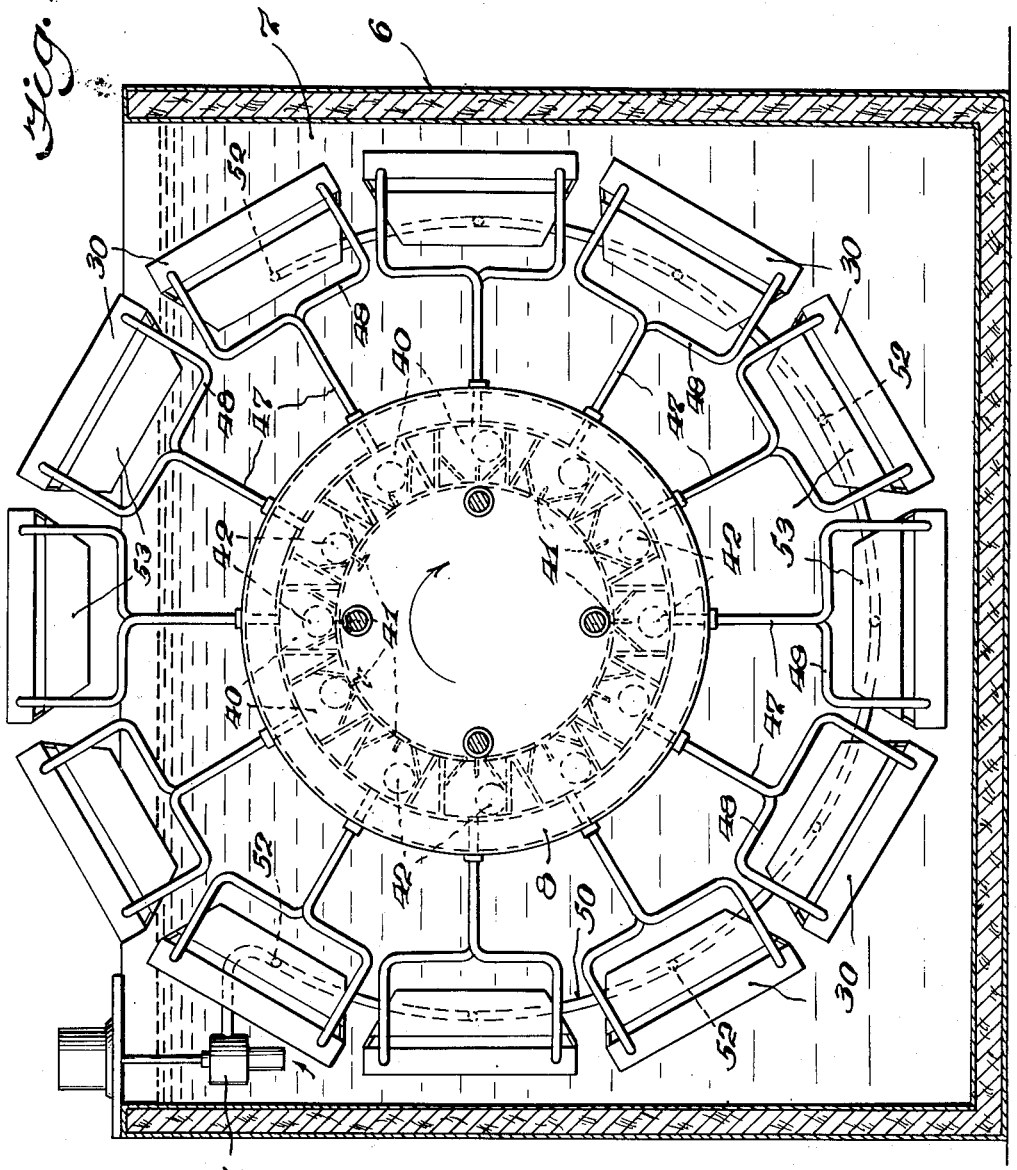
Fig. 2 is a transverse sectional view taken on the line 2—2 of Fig. 1.

Referring to the drawings, 6 designates a tank or the like adapted to hold liquid 7 to be frozen in the molds. A carrier which may consist of a pair of rigidly connected drums 8 and 9, is arranged in the tank, and provided with trunnions 10 and 11 rotatably mounted in any suitable manner, for example, in opposite walls of the tank for rotation about a horizontal axis. Rotation may be caused by any suitable means. For example, trunnion 10 may have a fixed pulley 12, driven by a belt 13 from any suitable prime mover 14.

A stationary pipe 15 extends through the trunnion 11 and surrounds a stationary tube 16 through which a refrigerant fluid may be introduced into a compartment 17 of the drum 9, such compartment being separated from another compartment 18 of the drum by an imperforate partition 19.

Drum 9 is provided with a circular series of inlet valve casings 20 and another circular series of outlet valve casings 21. The details of each valve is illustrated in Fig. 6. The interior of the casings 20 communicate with the compartment 17 by means of ports 22 controlled by check valves 23. The other valve casings 21 communicate with the compartment 18 by ports 24 controlled by check valves 25. Each valve casing has a funnel shaped part 26 functioning as a guide for a weight ball 27, and the balls control the valves. It will thus be understood that when the balls are at the lower part of the drum, valves 23 and 25 will be open, whereas when the balls are at the upper part of the drum, such valves will be closed.

Figure 3:
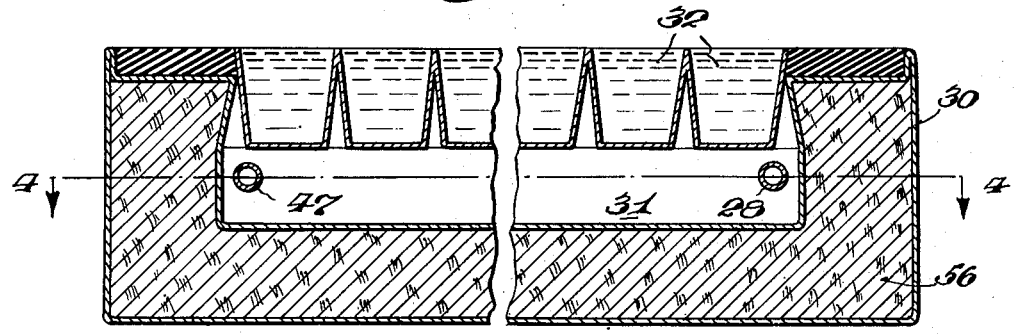
Fig. 3 is an enlarged transverse sectional view of one of the cube molds of the apparatus.
Figure 4:
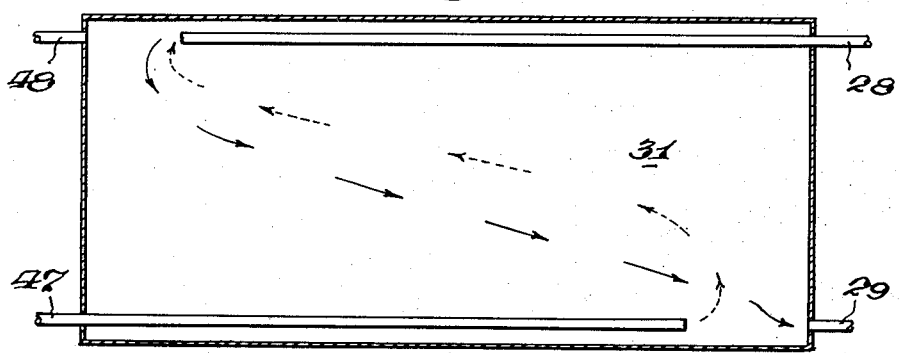
Fig. 4 is a horizontal sectional view of a portion of such mold taken on the line 4—4 of Fig. 3.

A pair of rigid pipes 28 and 29 extend from an adjacent pair of valve casings 20, 21, to each mold 30 which, as shown in Figs. 3 and 4, is provided with a compartment 31 through which the refrigerant may be circulated from pipe 28 to pipe 29. It may, therefore, be seen that while a mold is submerged in liquid in the tank, the refrigerant will flow through 16, past 23, through 28, 31, and 29, past 25 and out through 18 and 15, in order to cause freezing of tank liquid in the cube cells 32 (Fig. 3) of the mold. At the same time, the freezing fluid will be cut off from the molds above the water line, because the weight balls 27 will close the valves 23 and 25 at the top of the drum.

For thawing purposes, a tube 33, for conducting a heating fluid, extends through a stationary casing 34 and rotatable pipe 35, in the trunnion 10. The tube leads to a chamber 36 of the drum 8, and this chamber is separated from another chamber 37 of the drum by an imperforate partition 38. Compartment 36 communicates by means of ports 39 (Fig. 7) with the interior of a circular series of valve casings 40, and the ports are controlled by check valves 41 and weight balls 42, similar to those used in the drum 9, except that the valves 41 open toward the axis of the drum instead of toward the periphery thereof.

The compartment 37 which communicates with the outlet pipe 35, also communicates with a circular series of valve casings 43 of drum 8 by means of ports 44 controlled by check valves 45 and weight balls 46. It will thus be seen that when a mold 30 is in upper position, the heating fluid will flow from tube 33 through compartment 36 and a rigid pipe 47 to the compartment 31 of the mold, and then from that compartment through a rigid pipe 48 to one of the valve casings 43, through compartment 37 and pipe 35, into chamber 34, from which it is discharged through a conduit 49. Due to this construction, the valves will be controlled by gravity, and it will be unnecessary to extend any control means for them outside of the drums in which they are housed.

For the purpose of keeping the tank liquid agitated to facilitate the production of clear cubes, I arrange within the tank, near one end thereof, a curved tube 50, receiving tank water from a pump 51 driven in any suitable way, and adapted to force the liquid through nozzles 52, arranged to create currents between the peripheries of the drums and the cell sides of the molds. In the present invention, the cells face the drums and the cell side of each drum is provided with a hood 53 forming a passageway, with the mold, through which liquid from nozzles 52 will circulate from one end of the hood to the other. Each hood has an inclined side 54 functioning as a guide for cubes thawed from the cells of the mold, and it may be seen from Fig. 1 that cubes discharged from a mold will slide down the side 54 of the hood onto a stationary chute 55 leading to any suitable point for the further handling of the cubes.

Figure 5:
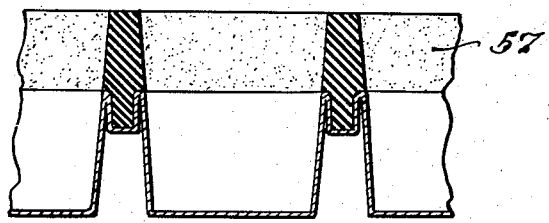
Fig. 5 is a vertical sectional view of a detail of a modification.

I preferably insulate the walls of the tank, the drums, trunnions, and molds, as indicated at 56, and instead of making the cell compartment of each mold entirely of one material, I may provide each cell with lips 57 of rubber, or the like, as indicated in Fig. 5, as this will facilitate discharge of ice cubes from the molds.

From the foregoing, it is believed that the construction, operation, and advantages of my improved apparatus may be readily understood, and it is manifest that changes may be made in the details disclosed without departing from the spirit of the invention as expressed in the claims.

What I claim and desire to secure by Letters Patent is:

1. In an apparatus of the character described, a series of hollow molds each having a compartment in which a liquid is to be frozen, means for moving the molds into and out of the liquid, means for passing a refrigerant through the molds while the compartments thereof are submerged in the liquid, means for passing a heating fluid through the molds when they are in position above the liquid, and valve means movable with the molds and controlled by movement of the mold moving means, for controlling the refrigerant passing means and the heating fluid passing means.

2. In an apparatus of the character described, a receptacle containing a liquid to be frozen, a series of hollow molds, means for moving said molds successively into and out of the liquid, first fluid conducting means for passing a refrigerant through each mold while the mold is submerged in the liquid, second fluid conducting means for passing a heating fluid through each mold when the mold is in a position above the liquid, and valve means movable with the molds and controlled by the movement thereof for controlling said first and second fluid conducting means in such a manner that the refrigerant will be passed through a mold whenever it is submerged in the liquid and a heating fluid will be passed through the mold while it is above the liquid.

3. In an apparatus of the character described, means containing a liquid to be frozen, a hollow mold having a cell to receive the liquid contained in the last mentioned means, means for moving said mold into and out of the liquid a hood, having open ends, connected to the cell side of the mold, and means in the liquid containing means for directing a jet of fluid through said hood while the mold is submerged in the liquid.

4. In an apparatus of the character described, a hollow insulated mold having exposed cells to receive a liquid to be frozen, means for moving the mold into and out of the liquid, means for passing a refrigerant through the mold while it is submerged in the liquid, means for passing a heating fluid through the mold when it is in a position above the liquid, and valve means movable with the mold and controlled by movement of the mold moving means, for controlling the refrigerant passing means and the heating fluid passing means.

5. An apparatus as claimed in claim 4, in which the means for moving the mold into and out of the liquid comprises drum means rotatable about a horizontal axis, and means for rotating said drum means.

6. An apparatus as claimed in claim 4, in which the valve means comprises valves, and gravity actuated weights controlling said valves.

7. An apparatus as claimed in claim 4, in which the valve means comprises check valves, and spherical weights controlling said valves.

8. An apparatus as claimed in claim 4, in which the valve means comprises valve casings carried by the means for moving the mold into and out of the liquid, check valves cooperating with said casings to control the entrance of fluid to and exit of fluid from the casings, and gravity actuated weights arranged in the casings and controlling the valves.

9. In an apparatus of the character described, means containing a liquid to be frozen, drum means rotatably mounted relatively to the liquid containing means, a series of hollow molds carried by the drum means, circumferentially arranged about the periphery of the drum means and rigidly connected thereto and adapted to be moved by the drum means into and out of said liquid, each mold having exposed cells in which the liquid is to be frozen, means for passing a refrigerant through the molds while the cells thereof are submerged in the liquid, means for passing a heating fluid through the molds when they are in position above the liquid, and valve means movable with the molds and controlled by movement of the drum means, for controlling the refrigerant passing means and the heating fluid passing means.

10. In an apparatus of the character described, means containing a liquid to be frozen, rotatable drum means rotatably mounted in the liquid containing means and comprising a plurality of drums, a partition in each drum dividing the same into a fluid inlet chamber and a fluid outlet chamber, a series of hollow molds carried by the drums and adapted to be successively submerged in said liquid and then to be elevated above the liquid by said drums, each mold being provided with cells in which the liquid is to be frozen, means for passing a refrigerant through the molds while the cells thereof are submerged in the liquid, means for passing a heating fluid through the molds when they are in position above the liquid, and valve means movable with the drum means and controlled by movement of the latter, for controlling the refrigerant passing means and the heating fluid passing means.

11. An apparatus as claimed in claim 10, in which each of the molds is insulated to prevent the refrigerant or heating fluid passing through any of the molds from directly affecting the liquid with the exception of the liquid in the cells.

12. In an apparatus of the character described, means containing a liquid to be frozen, a hollow mold having a compartment in which the liquid is to be frozen, means for moving said mold into and out of the liquid, conduit means for passing a refrigerant through the mold while the latter is submerged in the liquid, weight controlled valve means movable with the mold and controlled by movement of the mold moving means for controlling the refrigerant passing means, second conduit means for passing a heating fluid through the mold when it is in a position above the liquid, and second weight controlled valve means movable with the mold and controlled by movement of the mold moving means, for controlling the heating fluid passing means.

13. In an apparatus of the character described, means containing a liquid to be frozen, a hollow insulated mold provided with exposed cells to receive such liquid and also with an internal chamber through which a refrigerant or heating fluid may be passed, means for moving said mold into and out of the liquid, means for passing a refrigerant through the mold chamber while the latter is submerged in the liquid, means for passing a heating fluid through the mold chamber when it is in a position above the liquid, and valve means movable with the mold and controlled by movement of the mold moving means, for controlling the refrigerant passing means and the heating fluid passing means.

THOMAS B. GILLIAM.